J. J. MATHEY.
CORN TIPPER.
APPLICATION FILED NOV. 16, 1914.

1,131,938.

Patented Mar. 16, 1915.

Witnesses

Inventor
JOHN J. MATHEY
By Watson E. Coleman
Attorney

UNITED STATES PATENT OFFICE.

JOHN J. MATHEY, OF ROBEY, SOUTH DAKOTA.

CORN-TIPPER.

1,131,938. Specification of Letters Patent. Patented Mar. 16, 1915.

Application filed November 16, 1914. Serial No. 872,425.

*To all whom it may concern:*

Be it known that I, JOHN J. MATHEY, a citizen of the United States, residing at Robey, in the county of Aurora and State of South Dakota, have invented certain new and useful Improvements in Corn-Tippers, of which the following is a specification, reference being had to the accompanying drawings.

My invention relates to devices for stripping corn from the cob, and more particularly to devices called corn tippers, whereby the irregular grains of corn at the ends of the cob may be removed, where the corn is to be used for seed corn.

The primary object of my invention is the provision of a very simple and thoroughly effective device of this character, very cheaply constructed, and which will act, upon the rotation of the cob therein, to quickly cut away the irregular grains at the tip of an ear of seed corn.

My invention is illustrated in the accompanying drawing, wherein—

Figure 1:
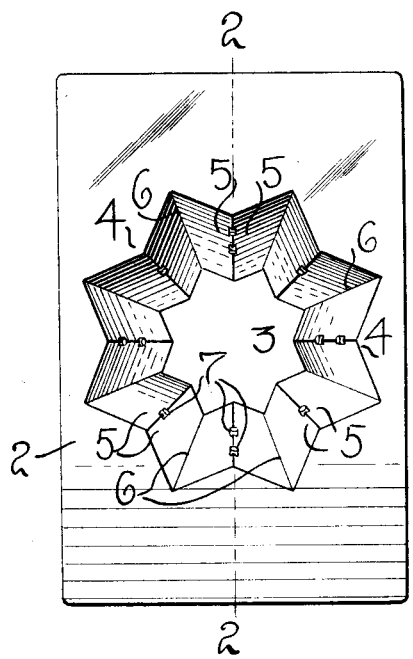
Figure 2:
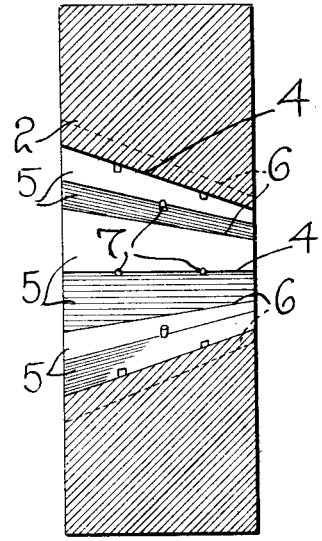

Figure 1 is a face view of a corn tipper, looking toward the large end of the cob receiving opening; Fig. 2 is a section on the line 2—2 of Fig. 1.

Corresponding and like parts are referred to in the following description and designated in all parts of the accompanying drawing by like reference numerals.

Referring again to the figures, 2 designates a body which as illustrated is formed of a block of wood or any other suitable material, and which is so formed as to provide a tapering socket 3 extending entirely through it, the walls of which are provided with tapering corrugations.

Preferably the inner face or wall of the socket is formed with a plurality of reëntrantly angled faces 5 to form the corrugations 4, the adjacent faces of any two corrugations providing between them a channel 6. The apex of each corrugation is relatively sharp and each corrugation is of course tapered from one face of the block to the other. Pins 7 forming teeth are disposed at intervals in the crests of the corrugations, and preferably the teeth are arranged in staggered relation to each other so that on one corrugation there will be two teeth and on the next corrugation there will be one tooth disposed on a line between the other teeth. Of course, I do not wish to limit myself to any particular number of these teeth. These teeth or pins project about one-sixteenth of an inch beyond the surface of the material from which the tipper is made.

The practical use of my device will be obvious. The tipper is supported in one hand and the tip or butt of the ear of corn is forced into the large end of the socket 3. The ear of corn and the body 2 are then relatively rotated and this rubs off the grains of corn around the tip or butt of the cob, thus leaving the grains on the cob of uniform size and cutting away the small and irregular grains which are liable to grow at the tip or butt end of the cob. The wall of the socket is corrugated not only for the purpose of providing ribs which will exert a grinding action upon the grains of corn, but also for the purpose of providing the channels 6 by which the shelled grains of corn can be discharged.

While I have illustrated my device as in the form of a block of material such as wood, I wish it understood that it is also within the purview of my invention to make the tipper of stamped metal or in any other suitable manner.

It will of course be noted that by reason of the tapering form of the socket or opening through the body, that the device is adapted to be used with cobs of various sizes, the larger diameter of the opening being of such size as to receive the butt end of a very large ear and the socket tapering from this larger opening to an extent which will cause the smallest portion of the socket to engage the grains which are carried on the tip of a very small corn cob. The body is adapted to be readily held in the hand of the operator and may be made any convenient shape to that end.

Having described my invention, what I claim is:

As an article of manufacture, a corn tipper comprising a block adapted to be held oils consisting in adding phosphoric acid to distillates of resin, heating the composition to about 300° C. and more so as to cause said acid to be converted into pyro-phosphoric acid and meta-phosphoric acid, and then letting these compounds act upon the resin, substantially as described.

In testimony whereof I affix my signature in presence of two witnesses.

Dr. MEILICH MELAMID.

Witnesses:
A. DELK,
H METZGROL.